United States Patent
Hayashi et al.

(10) Patent No.: US 12,381,218 B2
(45) Date of Patent: *Aug. 5, 2025

(54) POSITIVE ELECTRODE ACTIVE MATERIAL FOR LITHIUM ION SECONDARY BATTERY AND LITHIUM ION SECONDARY BATTERY

(71) Applicant: SUMITOMO METAL MINING CO., LTD., Tokyo (JP)

(72) Inventors: Tetsutaro Hayashi, Niihama (JP); Willy Shun Kai Bong, Niihama (JP); Shinsuke Suganuma, Niihama (JP); Toshihiro Kato, Tokyo (JP)

(73) Assignee: SUMITOMO METAL MINING CO., LTD., Tokyo (JP)

( * ) Notice: Subject to any disclaimer, the term of this patent is extended or adjusted under 35 U.S.C. 154(b) by 521 days.

This patent is subject to a terminal disclaimer.

(21) Appl. No.: 17/761,892

(22) PCT Filed: Sep. 18, 2020

(86) PCT No.: PCT/JP2020/035589
§ 371 (c)(1),
(2) Date: Mar. 18, 2022

(87) PCT Pub. No.: WO2021/054467
PCT Pub. Date: Mar. 25, 2021

(65) Prior Publication Data
US 2022/0344656 A1     Oct. 27, 2022

(30) Foreign Application Priority Data
Sep. 19, 2019    (JP) .................................. 2019-170438

(51) Int. Cl.
  H01M 4/525   (2010.01)
  H01M 4/36    (2006.01)
  (Continued)

(52) U.S. Cl.
  CPC ........... H01M 4/525 (2013.01); H01M 4/366 (2013.01); H01M 4/505 (2013.01);
  (Continued)

(58) Field of Classification Search
  CPC ...... H01M 4/525; H01M 4/505; H01M 4/131; H01M 4/366; H01M 2004/028; H01M 2004/021
  See application file for complete search history.

(56) References Cited

U.S. PATENT DOCUMENTS

| | | |
|---|---|---|
| 2011/0065002 A1 | 3/2011 | Nagase |
| 2018/0047977 A1 | 2/2018 | Furuichi et al. |
| 2018/0254481 A2 | 9/2018 | Kamata et al. |

FOREIGN PATENT DOCUMENTS

| | | |
|---|---|---|
| CN | 102067362 A | 5/2011 |
| JP | 2013-125732 A | 6/2013 |

(Continued)

OTHER PUBLICATIONS

Office Action dated Jan. 4, 2024, issued in counterpart CN application No. 202080065825.5, with English translation. (10 pages).

(Continued)

*Primary Examiner* — Laura Weiner
(74) *Attorney, Agent, or Firm* — WHDA, LLP

(57) ABSTRACT

To provide a positive electrode active material capable of further reducing positive electrode resistance and exhibiting better output characteristics.
A positive electrode active material includes a coating layer formed of a metal composite oxide of Li and one or more metal elements selected from Al, Ti, Zr, Nb, Mo, and W on at least a part of a surface of lithium transition metal-containing composite oxide particles, and has d50 of 3.0 to 7.0 μm, a BET specific surface area of 2.0 to 5.0 m²/g, a tap density of 1.0 to 2.0 g/cm³, and an oil absorption amount of (Continued)

30 to 60 ml/100 g, in which the amount of metal elements other than Li contained in the coating layer is 0.1 to 1.5 atom % with respect to the total number of atoms of Ni, Mn, and Co contained in the composite oxide particles.

8 Claims, 3 Drawing Sheets

(51) Int. Cl.
  *H01M 4/505* (2010.01)
  *H01M 10/0525* (2010.01)
  *H01M 4/02* (2006.01)
  *H01M 4/131* (2010.01)
(52) U.S. Cl.
  CPC .. *H01M 10/0525* (2013.01); *H01M 2004/021* (2013.01); *H01M 2004/028* (2013.01); *H01M 4/131* (2013.01)

(56) References Cited

FOREIGN PATENT DOCUMENTS

| | | |
|---|---|---|
| JP | 2018-104275 A | 7/2018 |
| JP | 2019-139889 A | 8/2019 |
| WO | 2014/181891 A1 | 11/2014 |
| WO | 2016/140207 A1 | 9/2016 |
| WO | 2019/189421 A1 | 10/2019 |

OTHER PUBLICATIONS

International Search Report dated Dec. 28, 2020, issued in counterpart International application No. PCT/ JP2020/035589, with English translation. (10 pages).

POSITIVE ELECTRODE ACTIVE MATERIAL FOR LITHIUM ION SECONDARY BATTERY AND LITHIUM ION SECONDARY BATTERY

TECHNICAL FIELD

The present invention relates to a positive electrode active material for a lithium ion secondary battery formed of a lithium nickel-containing composite oxide and a lithium ion secondary battery using the positive electrode active material for a lithium ion secondary battery as a positive electrode material.

BACKGROUND ART

In recent years, with spread of a portable electronic device such as a smartphone, a tablet terminal, a digital camera, or a notebook personal computer, there is a strong demand for development of a small and lightweight secondary battery having a high energy density. Furthermore, there is a strong demand for development of a high-capacity and high-output secondary battery as a power source for an electric car such as a hybrid electric car, a plug-in hybrid electric car, or a battery-powered electric car.

As a secondary battery satisfying such a requirement, there is a lithium ion secondary battery. This lithium ion secondary battery includes a negative electrode, a positive electrode, a non-aqueous electrolyte or a solid electrolyte, and the like, and as an active material used as a material for these negative electrode and positive electrode, a material capable of de-inserting and inserting lithium is used. Note that, as the non-aqueous electrolyte, there is a non-aqueous electrolyte solution that is obtained by dissolving a lithium salt as a supporting salt in an organic solvent, and as the solid electrolyte, there is an inorganic or organic solid electrolyte that is non-flammable and has lithium ion conductivity.

Among lithium ion secondary batteries, a lithium ion secondary battery using a lithium transition metal-containing composite oxide having a layered rock salt type or spinel type crystal structure as a positive electrode material has been researched and developed and has been put into practical use as a battery having a high energy density because a voltage at a level of 4 V can be obtained.

As the positive electrode material of the lithium ion secondary battery, positive electrode active materials formed of lithium transition metal-containing composite oxides such as lithium cobalt composite oxide ($LiCoO_2$) for which synthesis is relatively easy, lithium nickel composite oxide ($LiNiO_2$) that uses nickel less expensive than cobalt, lithium nickel manganese cobalt composite oxide ($LiNi_{1/3}Mn_{1/3}Co_{1/3}O_2$), lithium manganese composite oxide ($LiMn_2O_4$) that uses manganese, and lithium nickel manganese composite oxide ($LiNi_{0.5}Mn_{0.5}O_2$) have been proposed.

In recent years, a ternary-system positive electrode active material formed of lithium nickel manganese cobalt-containing composite oxide (NMC) containing at least nickel, manganese, and cobalt as a transition metal, including lithium nickel manganese cobalt composite oxide ($LiNi_{1/3}Mn_{1/3}Co_{1/3}O_2$) of these lithium transition metal-containing composite oxides, has attracted attention as a material that is excellent in thermal stability, has a high capacity, has also satisfactory cycle characteristics of a battery capacity, and has a low resistance and is capable of obtaining a high output. The lithium nickel manganese cobalt composite oxide is a compound having a layered rock salt type crystal structure that is similar to lithium cobalt composite oxide, lithium nickel composite oxide, and the like.

The lithium transition metal-containing composite oxide has been developed focusing on an increase in output by reducing its internal resistance. In particular, in power application for an electric car, higher output by further reducing internal resistance is required at a high level.

In order to improve the output characteristics and cycle characteristics of the positive electrode active material formed of a lithium transition metal-containing composite oxide such as lithium nickel-containing composite oxide or lithium nickel manganese cobalt-containing composite oxide, it is important to constitute the lithium transition metal-containing composite oxide with particles having a small particle size and a narrow particle size distribution. Particles having a small particle size have a large specific surface area, and when such particles are used as a positive electrode active material, a reaction area with an electrolyte can be sufficiently secured. Furthermore, the particles form a thin positive electrode, and a movement distance of lithium ions between a positive electrode and a negative electrode can be shortened. Therefore, by using particles having a small particle size, positive electrode resistance can be reduced. Furthermore, by using particles having a narrow particle size distribution, a voltage to be applied to particles in an electrode can be made uniform, and therefore a decrease in battery capacity due to selective degradation of fine particles can be suppressed.

In order to further improve the output characteristics, it has been researched and developed that the particle structure of the lithium transition metal-containing composite oxide is improved. For example, in order to improve the output characteristics, it is conceivable that forming of a space section which an electrolyte can enter inside the positive electrode active material is effective. By adopting such a structure, as compared with a positive electrode active material with a solid structure having the same degree of particle size, the reaction area with the electrolyte can be increased. Therefore, the positive electrode resistance can be considerably reduced. Note that it is known that the positive electrode active material inherits the particle properties of a transition metal-containing composite hydroxide serving as a precursor thereof. That is, in order to obtain the positive electrode active material having a space section, it is necessary to appropriately control the particle size, the particle size distribution, the particle structure, and the like of secondary particles of the transition metal-containing composite hydroxide serving as a precursor of the positive electrode active material.

WO 2014/181891 A1 and JP 2018-104275 A disclose a method for manufacturing a transition metal-containing composite hydroxide, the method including: a nuclear generation process of performing nuclear generation by controlling a pH value of an aqueous solution for nuclear generation containing at least a transition metal-containing metal compound and an ammonium ion supplier so as to be within a range of 12.0 or more and 14.0 or less; and a particle growth process of growing particles by controlling a pH value of an aqueous solution for particle growth containing the generated nuclei so as to be lower than the pH value in the nuclear generation process and within a range of 10.5 or more and 12.0 or less, in which atmosphere control of setting an atmosphere of the nuclear generation process and an initial stage of the particle growth process to a non-oxidizing atmosphere, switching the atmosphere to an oxidizing atmosphere at a predetermined timing in the particle growth process, and then switching the atmosphere to the non-oxidizing atmosphere again is performed twice. According to this method, it is possible to obtain a transition metal-containing composite hydroxide that is formed of secondary particles having a small particle size and a narrow particle size distribution, and having a center section formed of an aggregation of plate-shaped or needle-shaped primary particles, and two laminated structures formed outside the center section each of which a low density layer formed of an aggregation of fine primary particles and a high density layer formed of an aggregation of plate-shaped primary particles are alternately laminated.

A positive electrode active material using the transition metal-containing composite hydroxide having such a structure as a precursor has a small particle size, a narrow particle size distribution, and a porous structure having a space section. In a secondary battery using the positive electrode active material having such a porous structure, output characteristics can be improved as well as capacity characteristics and cycle characteristics.

CITATION LIST

Patent Literature

Patent Literature 1: WO 2014/181891 A
Patent Literature 2: JP 2018-104275 A

SUMMARY OF INVENTION

Technical Problem

However, further improvement in output characteristics of the positive electrode active materials described in these literatures is required.

In view of the above problems, an object of the present invention is to provide a positive electrode active material for a lithium ion secondary battery capable of exhibiting excellent output characteristics when the positive electrode active material is used in a lithium ion secondary battery.

Solution to Problem

A positive electrode active material for a lithium ion secondary battery according to an aspect of the present invention includes:

lithium transition metal-containing composite oxide particles having a composition represented by general formula (A): $Li_{1+u}Ni_xMn_yCo_zM1_tO_2$, where $-0.05 \leq u \leq 0.5$, $x+y+z+t=1$, $0.3 \leq x \leq 0.9$, $0 \leq y \leq 0.5$, $0 \leq z \leq 0.5$, $0 \leq t \leq 0.1$, and M1 represents one or more additive elements selected from Mg, Al, Si, Ca, Ti, V, Cr, Zr, Nb, Mo, Hf, Ta, and W, and a layered rock salt type crystal structure; and a coating layer present on at least a part of a surface of the lithium transition metal-containing composite oxide particles and formed of fine particles and/or a coating film of a metal composite oxide of Li and a metal element M2, where M2 represents one or more metal elements selected from Al, Ti, Zr, Nb, Mo, and W.

The lithium transition metal-containing composite oxide particles including the coating layer have a 50% cumulative diameter d50 of 3.0 μm or more and 7.0 μm or less, the 50% cumulative diameter d50 being determined from a particle size distribution measured value, a BET specific surface area of 2.0 m²/g or more and 5.0 m²/g or less, a tap density of 1.0 g/cm³ or more and 2.0 g/cm³ or less, and an oil absorption amount of 30 ml/100 g or more and 60 ml/100 g or less.

The amount of M2 contained in the coating layer is 0.1 atom % or more and 1.5 atom % or less with respect to the total number of atoms of Ni, Mn, and Co contained in the lithium transition metal-containing composite oxide particles. Note that the total amount of M1 and M2 in the entire positive electrode active material for a lithium ion secondary battery is preferably 10 atom % or less with respect to the total number of atoms of Ni, Mn, Co, M1, and M2.

The 50% cumulative diameter d50 of the lithium transition metal-containing composite oxide particles including the coating layer, the 50% cumulative diameter d50 being determined from the particle size distribution measured value, is preferably 4.0 μm or more and 6.0 μm or less.

[(d90−d10)/d50], where d10 is a 10% cumulative diameter determined from a particle size distribution measured value, and d90 is a 90% cumulative diameter determined from the particle size distribution measured value, the [(d90−d10)/d50] being an index indicating spread of a particle size distribution of the lithium transition metal-containing composite oxide particles including the coating layer, is preferably 1.0 or less.

A value of d90/d10 of the lithium transition metal-containing composite oxide particles including the coating layer is preferably 1.0 or more and 2.0 or less.

The lithium transition metal-containing composite oxide particles are composed of secondary particles each formed of an aggregation of primary particles, and the secondary particle preferably has an aggregated section, one or more communication holes communicating with an outer periphery section of the aggregated section, and two or more space sections present inside the aggregated section and communicating with the one or more communication holes. The number of the one or more communication holes is preferably two or more. The two or more space sections preferably communicate with the communication holes or another space section.

M2 contained in the coating layer is preferably W, and the metal composite oxide is preferably lithium tungstate.

A lithium ion secondary battery according to an aspect of the present invention is characterized by including a positive electrode, a negative electrode, a separator, and a non-aqueous electrolyte, in a case of a non-aqueous electrolyte secondary battery, or including a positive electrode, a negative electrode, and a solid electrolyte, in a case of a solid electrolyte secondary battery, in which the positive electrode active material for a lithium ion secondary battery of an aspect of the present invention is used as a positive electrode active material used in the positive electrode.

Advantageous Effects of Invention

In the positive electrode active material for a lithium ion secondary battery according to an aspect of the present invention, by increasing a contact area with a non-aqueous electrolyte or a solid electrolyte and coating lithium transition metal-containing composite oxide particles with a Li-containing metal composite oxide, insertion and de-insertion of lithium ions at an interface thereof can be further promoted to improve output characteristics. Therefore, a lithium ion secondary battery according to an aspect of the present invention to which the positive electrode active material for a lithium ion secondary battery according to an aspect of the present invention is applied has better durability and can provide high output characteristics, and therefore industrial significance thereof is remarkable particularly in power application for an electric car.

DESCRIPTION OF EMBODIMENTS

Figure 1:
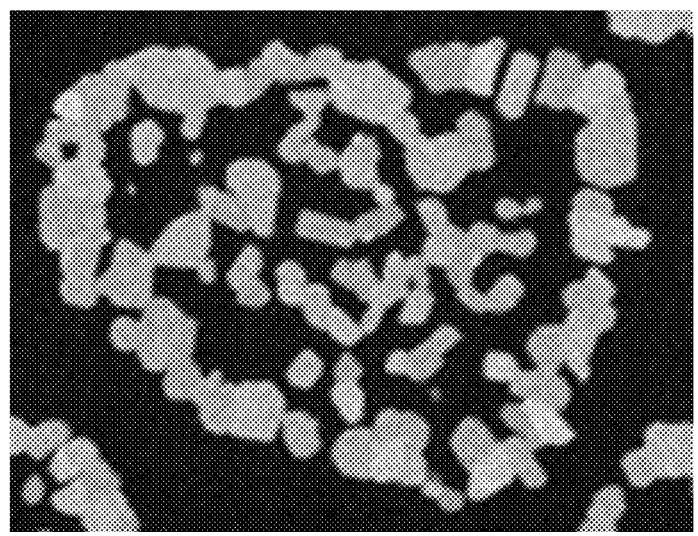
FIG. 1 is an SEM image of a cross section of secondary particles constituting a positive electrode active material for a lithium ion secondary battery of Example 1.

1. Positive Electrode Active Material for Lithium Ion Secondary Battery

A positive electrode active material for a lithium ion secondary battery (hereinafter, referred to as a "positive electrode active material") according to an embodiment of the present invention includes lithium transition metal-containing composite oxide particles (hereinafter, referred to as "composite oxide particles") and a coating layer present on at least a part of a surface of the composite oxide particles. In particular, the positive electrode active material for a lithium ion secondary battery according to the present embodiment satisfies the following requirements (1) to (6).
(1) Composite Oxide Particles
(1-a) Composition The composite oxide particles have a composition represented by general formula (A): $Li_{1+u}Ni_xMn_yCo_zM1_tO_2$, where $-0.05 \leq u \leq 0.5$, $x+y+z+t=1$, $0.3 \leq x \leq 0.9$, $0 \leq y \leq 0.5$, $0 \leq z \leq 0.5$, $0 \leq t \leq 0.1$, and M1 is one or more additive elements selected from Mg, Al, Si, Ca, Ti, Si, V, Cr, Zr, Nb, Mo, Hf, Ta, and W, and a layered rock salt type crystal structure.

In the positive electrode active material of the present embodiment, a value of u indicating an excessive amount of lithium (Li) is −0.05 or more and 0.5 or less. The value of u is preferably 0 or more and 0.50 or less, and more preferably 0 or more and 0.35 or less. By regulating the value of u to be within the above range, it is possible to improve output characteristics and battery capacity of a lithium ion secondary battery using this positive electrode active material as a positive electrode material. On the other hand, when the value of u is less than −0.05, positive electrode resistance of the secondary battery is large, and therefore there is a possibility that the output characteristics cannot be improved. When the value of u exceeds 0.5, not only initial discharge capacity decrease, but also there is a possibility that the positive electrode resistance increases.

Nickel (Ni) is an element that contributes to potential increase and capacity enlargement of a secondary battery, and a value of x indicating the content of nickel is 0.3 or more and 0.9 or less. The value of x is preferably 0.4 or more and 0.7 or less, and more preferably 0.4 or more and 0.6 or less. When the value of x is less than 0.3, there is a possibility that the energy density of a secondary battery using this positive electrode active material cannot be sufficiently improved. When the value of x exceeds 0.9, the content of another element that improves output characteristics and durability decreases, and there is a possibility that characteristics as a positive electrode active material cannot be sufficiently obtained.

Manganese (Mn) is an element that contributes to improvement of thermal stability, and a value of y indicating the content of manganese is 0 or more and 0.5 or less. The value of y is preferably 0.1 or more and 0.4 or less. When the value of y exceeds 0.5, Mn elutes from the positive electrode active material during high-temperature operation, and charge and discharge cycle characteristics may deteriorate.

Cobalt (Co) is an element that contributes to improvement of charge and discharge cycle characteristics and output characteristics, and a value of z indicating the content of cobalt is 0 or more and 0.5 or less. The value of y is preferably 0.1 or more and 0.4 or less. When the value of z exceeds 0.5, initial discharge capacity of a secondary battery using this positive electrode active material may decrease.

In the positive electrode active material of the present embodiment, an additive element for further improving the durability and output characteristics of the secondary battery is basically present in the coating layer described later. However, also in the positive electrode active material of the present embodiment, the following additive element M1 can be present inside the composite oxide particles. As such an additive element M1, it is possible to use one or more kinds selected from magnesium (Mg), aluminum (Al), silicon (Si), calcium (Ca), titanium (Ti), vanadium (V), chromium (Cr), zirconium (Zr), niobium (Nb), molybdenum (Mo), hafnium (Hf), tantalum (Ta), and tungsten (W).

A value of t indicating the content of the additive element M1 is 0 or more and 0.1 or less. The value of t is preferably 0.001 or more and 0.05 or less. When the value of t exceeds 0.1, a metal element that contributes to a Redox reaction decreases, and thus the battery capacity of the secondary battery decreases. Note that when the metal element M2 described later is present in the coating layer, the total amount of M1 and M2 in the entire positive electrode active material is preferably 10 atom % or less with respect to the total number of atoms of Ni, Mn, Co, M1, and M2.

The composite oxide particles in the present embodiment are preferably constituted by a lithium nickel manganese cobalt-containing composite oxide (NMC) containing Ni, Mn, and Co as main transition metals. In this case, the composite oxide particles preferably have a composition represented by general formula (B): $Li_{1+u}Ni_xMn_yCo_zM1_tO_2$, where $-0.05 \leq u \leq 0.5$, $x+y+z+t=1$, $0.3 \leq x \leq 0.7$, $0.15 \leq y \leq 0.4$, $0.15 \leq z \leq 0.4$, $0 \leq t \leq 0.1$, and M1 is one or more additive elements selected from Mg, Al, Si, Ca, Ti, V, Cr, Zr, Nb, Mo, Hf, Ta, and W.

The compositions of the positive electrode active material and the composite oxide particles can be confirmed by, for example, Rietveld analysis of parameters obtained by inductively coupled plasma emission spectrometry and powder X-ray diffraction.

(1-b) Particle Structure

In the positive electrode active material of the present embodiment, the composite oxide particles can be constituted by primary particles or secondary particles each formed of an aggregation of a plurality of primary particles.

In particular, the composite oxide particles are composed of secondary particles each formed of an aggregation of primary particles, and the secondary particle preferably has an aggregated section, one or more communication holes communicating with an outer periphery section of the aggregated section, and two or more space sections present inside the aggregated section and communicating with the one or more communication holes.

The two or more space sections preferably communicate with the one or more communication holes or another space section. The number of the one or more communication holes is also preferably two or more.

When the composite oxide particles have such a secondary particle structure, particle properties of the positive electrode active material of the present embodiment described later can be easily achieved.

When the communication hole in the outer periphery section does not communicate with the internal space section, the space section inside the particle is isolated, an electrolyte cannot sufficiently enter the composite oxide particle (secondary particle), and a sufficient reaction field cannot be secured. Therefore, in a secondary battery using this positive electrode active material, desired battery performance cannot be sufficiently exhibited in some cases. Each of the two or more internal space sections can directly communicate with the communication hole in the outer periphery section. Alternatively, each of the two or more internal space sections can communicate with the communication hole in the outer periphery section through another communication hole.

With such a structure, an electrolyte sufficiently enters the space section inside the particle through the communication hole in the outer periphery section. Therefore, lithium can be de-inserted and inserted not only on a surface of the particle but also inside the particle, a sufficient reaction field is secured, and the internal resistance of the battery can be largely reduced.

Therefore, when a lithium ion secondary battery is constituted using a positive electrode active material having such a structure as a positive electrode material, the output characteristics can be further improved.

(2) Coating Layer

The coating layer is present on at least a part of a surface of the composite oxide particles. The coating layer is formed of fine particles and/or a coating film of a metal composite oxide of Li and the metal element M2, where M2 represents one or more metal elements selected from Al, Ti, Zr, Nb, Mo, and W.

That is, in the positive electrode active material of the present embodiment, a coating layer formed of fine particles and/or a coating film of a metal composite oxide of Li and M2 is present on at least a part of a surface of composite oxide particles (secondary particles in a case where the positive electrode active material is formed of the secondary particles).

The coating layer of the metal composite oxide of Li and M2 has high lithium ion conductivity and has an effect of promoting movement of lithium ions. Therefore, since a conduction path of Li is formed in an interface with an electrolyte solution by presence of the coating layer of the metal composite oxide of Li and M2 on a surface of the composite oxide particles, reaction resistance of the positive electrode active material (positive electrode resistance) is reduced, and output characteristics of the positive electrode active material can be improved.

That is, a reduction in the positive electrode resistance will reduce the voltage lost in the secondary battery and relatively increase the voltage actually applied to the load. Thus, a high output is obtainable. Furthermore, an increase in the voltage applied to the load allows a sufficient amount of lithium to be stored in and released from the positive electrode. Thus, a battery capacity is also improved. Further, since the load of the positive electrode active material when charging and discharging is also reduced by reducing the positive electrode resistance, cycle characteristics can also be improved.

The metal element M2 constituting a metal composite oxide with Li is one or more selected from Al, Ti, Zr, Nb, Mo, and W.

Among these elements, M2 is preferably W, and the metal composite oxide constituting the coating layer is preferably lithium tungstate from a viewpoint of an action and effect by making the coating layer exist.

In order to enhance the action and effect by making the coating layer exist, the amount of the number of atoms of M2 in the coating layer with respect to the total number of atoms of Ni, Co, and Mn in the composite oxide particles (the number of atoms of M2/(the number of atoms of Ni+the number of atoms of Co+the number of atoms of Mn)×100) is 0.1 atom % or more and 1.5 atom % or less. The above value is preferably 0.1 atom % or more and 1.0 atom % or less, and more preferably 0.2 atom % or more and 0.9 atom % or less.

The composition of the coating layer can be confirmed using inductively coupled plasma emission spectrometry, electron beam microanalyzer analysis, or the like. The crystal structure of the coating layer can be confirmed using powder X-ray diffraction or electron beam diffraction.

The coating layer can adopt a form of fine particles and/or a coating film of a metal composite oxide of Li and M2. When the metal composite oxide of Li and M2 is formed of fine particles, the particle size of the fine particles is preferably within a range of 1 nm or more and 200 nm or less, and preferably within a range of 1 nm or more and 100 nm or less. When the particle size of the fine particles is less than 1 nm, the fine particles do not have sufficient lithium ion conductivity in some cases. An upper limit of the particle size is about 200 nm. However, when the particle size of the fine particles exceeds 100 nm, formation of coating with the fine particles is non-uniform, and an effect of reducing reaction resistance tends not to be sufficiently obtained. Therefore, 50% or more of the total number of the fine particles preferably have a particle size within a range of 1 nm or more and 100 nm or less.

When the metal composite oxide of Li and M2 is formed of a coating film, the thickness of the coating film is preferably within a range of 1 nm or more and 200 nm or less. When the thickness is less than 1 nm, the coating film does not have sufficient lithium ion conductivity in some cases. When the thickness exceeds 200 nm, a reaction area decreases, bulk resistance of an electrode increases, and the effect of reducing the reaction resistance cannot be sufficiently obtained in some cases.

Also when the fine particles and the coating film of the metal composite oxide of Li and M2 are mixed on a surface of the composite oxide particles, a high effect on battery characteristics can be obtained.

The coating layer of the metal composite oxide of Li and M2 can also be formed on the entire surface of the composite oxide particles. However, it is sufficient that the coating layer is formed in at least a part of the composite oxide particles, or the coating layer can be interspersed on the surface of the composite oxide particles. Even in such a case, the effect of reducing the reaction resistance of the positive electrode active material can be obtained by presence of the coating layer. However, the coating layer of the metal composite oxide of Li and M2 is desirably present uniformly on the surface of the composite oxide particles.

The properties of the coating layer can be determined by, for example, cross-section observation with a field emission scanning electron microscope, cross-section element mapping by EDX analysis with a scanning transmission electron microscope (STEM), cross-section observation with a transmission ionization microscope, or the like.

(3) Particle Size

The composite oxide particles including the coating layer constituting the positive electrode active material of the present embodiment have a 50% cumulative diameter d50 of 3.0 μm or more and 7.0 μm or less, the 50% cumulative diameter d50 being determined from a particle size distribution measured value.

More specifically, as for the particle size of the positive electrode active material (composite oxide particles including the coating layer), a particle size d50 at which a cumulative volume determined from a volume integrated value measured with a laser light diffraction scattering particle size analyzer is 50% of the total volume of all particles (when a cumulative curve of the particle size distribution is determined by setting the total volume to 100%, the particle size d50 is a particle size at a point where the cumulative curve is 50%) is preferably 3.0 μm or more and 7.0 μm or less. The d50 is preferably 4.0 μm or more and 6.5 μm or less, and more preferably 4.0 μm or more and 6.0 μm or less. When the d50 of the particles constituting the positive electrode active material is within such a range, not only battery capacity per unit volume of a secondary battery using this positive electrode active material can be increased, but also safety and output characteristics can be improved.

On the other hand, when the d50 is less than 3.0 μm, a filling property of the positive electrode active material decreases, and there is a possibility that battery capacity per unit volume cannot be increased. When the d50 exceeds 7.0 μm, a reaction area of the positive electrode active material decreases, and an interface with an electrolyte is decreased. Therefore, there is a possibility that it is difficult to improve output characteristics.

(4) BET Specific Surface Area

The composite oxide particles including the coating layer constituting the positive electrode active material of the present embodiment have a BET specific surface area of 2.0 $m^2/g$ or more and 5.0 $m^2/g$ or less.

The BET specific surface area of the positive electrode active material of the present embodiment is an index indicating particle properties (contact area with an electrolyte) of the positive electrode active material. When the positive electrode active material is composed of secondary particles each having an aggregated section, one or more communication holes communicating with an outer periphery section of the aggregated section, and two or more space sections present inside the aggregated section and communicating with the one or more communication holes, the BET specific surface area of the positive electrode active material represents a surface area including the one or more communication holes (opening sections) present in the outer periphery section of the secondary particle and fine cavities (space sections) inside the secondary particle.

The BET specific surface area is measured by a BET method using nitrogen gas adsorption.

The BET specific surface area is preferably 2.5 $m^2/g$ or more and 4.5 $m^2/g$ or less. When the specific surface area of the positive electrode active material is less than 2.0 $m^2/g$, in a case where a secondary battery is formed using this positive electrode active material, a reaction area with an electrolyte cannot be sufficiently secured, and there is a possibility that output characteristics are not sufficiently improved. When the specific surface area exceeds 5.0 $m^2/g$, the reaction area with an electrolyte is too large, and durability of the secondary battery may be deteriorated.

(5) Tap Density

The composite oxide particles including the coating layer constituting the positive electrode active material of the present embodiment have a tap density of 1.0 $g/cm^3$ or more and 2.0 $g/cm^3$ or less.

The tap density is an index of density reflecting the amount of solid domains inside a particle, for example, in a spherical particle.

When the tap density is less than 1.0 $g/cm^3$, even if the BET specific surface area is increased, the amount of solid domains in the particles is small, and durability of the secondary battery may be deteriorated. An upper limit of the tap density is not particularly limited. However, in the present invention, when the positive electrode active material is formed of secondary particles each having an aggregated section, one or more communication holes communicating with an outer periphery section of the aggregated section, and two or more space sections present inside the aggregated section and communicating with the one or more communication holes, the upper limit under normal manufacturing conditions is about 2.0 $g/cm^3$. The tap density is preferably 1.0 $g/cm^3$ or more, and more preferably 1.2 $g/cm^3$ or more.

Note that the tap density represents a bulk density after a powder sample collected in a vessel is tapped 100 times according to JIS Z-2504, and can be measured using a shaking specific gravity measuring device.

(6) Oil Absorption Amount

The composite oxide particles including the coating layer constituting the positive electrode active material of the present embodiment have an oil absorption amount of 30 ml/100 g or more and 60 ml/100 g or less.

The oil absorption amount is an index indicating the total volume of the space sections (all cavities) inside the particles. The oil supply amount is determined by operation according to a procedure described in "JIS K 6217-4: 2008 (Carbon black for rubber—Basic characteristics—Part 4: How to determine oil absorption amount (including compressed sample))". However, since the operation process is complicated, the oil absorption amount is generally measured using an oil absorption amount measuring apparatus put on the market in accordance with JIS described above. Note that di-n-butyl phthalate (DBP) is used as measurement oil (oil), and a measurement result is calculated in terms of an oil absorption amount per 100 g of a sample. Therefore, a unit thereof is represented by "ml/100 g".

When the oil absorption amount is less than 30 ml/100 g, a sufficient space section is not formed, and there is a possibility that a sufficient BET specific surface area cannot be obtained. On the other hand, when the absorption amount exceeds 60 ml/100 g, many space sections are structurally present inside the particle, a bulk density decreases, a filling property decreases, and there is a possibility that battery capacity per unit volume cannot be sufficiently obtained when a secondary battery is constituted. The oil absorption amount is preferably 35 ml/100 g or more and 55 ml/100 g or less.

(7) Particle Size Distribution

Optionally, in the composite oxide particles including the coating layer constituting the positive electrode active material of the present embodiment, [(d90−d10)/d50], which is an index indicating spread of a particle size distribution of the composite oxide particles, is preferably 1.0 or less, more preferably 0.7 or less, and still more preferably 0.6 or less. In a positive electrode active material having such a narrow particle size distribution, a ratio of fine particles and coarse particles is small, and therefore a secondary battery using this positive electrode active material is excellent in all of safety, cycle characteristics, and output characteristics.

When [(d90−d10)/d50] exceeds 1.0, the ratio of fine particles and coarse particles in the positive electrode active material increases. For example, when the ratio of fine particles is large, the secondary battery is likely to generate heat due to localized reaction of the fine particles, and in addition to deterioration in safety, the fine particles may be selectively deteriorated to deteriorate cycle characteristics. Furthermore, when the ratio of coarse particles is large, a reaction area between an electrolyte and the positive electrode active material cannot be sufficiently secured, and output characteristics may be poor.

In a case of assuming industrial scale manufacturing, it is not realistic to use a positive electrode active material having an excessively small [(d90−d10)/d50]. Therefore, in consideration of cost and productivity, a lower limit of [(d90−d10)/d50] is preferably about 0.3.

Note that meanings and a method for determining d10 and d90 in the index [(d90−d10)/d50] indicating spread of a particle size distribution are similar to those in the case of d50 described above. d90 means a particle size at which an accumulated volume obtained by accumulating the volume of each particle from a side having a smaller particle size is 90% of the total volume of all particles, and d10 means a particle size at which an accumulated volume obtained by accumulating the volume of each particle from a side having a smaller particle size is 10% of the total volume of all particles.

(8) d90/d10

Optionally, in the composite oxide particles including the coating layer constituting the positive electrode active material of the present embodiment, a ratio (d90/d10) of a value of d90 to a value of d10 determined from the particle size distribution measured value is preferably 1.0 or more and 2.0 or less, and more preferably 1.2 or more and 1.8 or less.

When the value of d90/d10 of the particles constituting the positive electrode active material is within the above range, not only battery capacity per unit volume of a secondary battery using this positive electrode active material can be increased, but also safety and output characteristics can be improved. When the value of d90/d10 exceeds 2.0, a reaction area of the positive electrode active material decreases, and an interface with an electrolyte is decreased. Therefore, there is a possibility that it is difficult to improve output characteristics.

(9) Crystallite Diameter Determined from X-Ray Diffraction Diagram of (003) Plane Optionally, as for the composite oxide particles including the coating layer constituting the positive electrode active material of the present embodiment, when the crystallite diameter of the primary particle is determined from a full width at half maximum of a peak of a (003) plane by X-ray diffraction using a Scherrer formula, the crystallite diameter is preferably within a range of 300 Å or more and 1500 Å or less, more preferably within a range of 400 Å or more and 1300 Å or less, and still more preferably within a range of 700 Å or more and 1250 Å or less. A positive electrode active material having a crystallite diameter within such a range has extremely high crystallinity, can reduce positive electrode resistance of a secondary battery, and can improve output characteristics thereof.

When the crystallite diameter of the (003) plane is less than 300 Å, the primary particles are fine, pores present between the primary particles in the positive electrode active material are too fine, and an electrolyte hardly enters the positive electrode active material. Therefore, a reaction area with the electrolyte is reduced, and output characteristics of the secondary battery are deteriorated. When the crystallite diameter of the (003) plane exceeds 1500 Å, the primary particles are too coarse, the ratio of pores in the secondary particles extremely decreases, and an entry path of an electrolyte decreases. Therefore, a reaction area with the electrolyte is reduced, and output characteristics of the secondary battery are deteriorated.

2. Method for Manufacturing Positive Electrode Active Material for Lithium Ion Secondary Battery The positive electrode active material of the above embodiment of the present invention is not limited by a method for manufacturing the positive electrode active material as long as the positive electrode active material has the above-described composition, crystal structure, particle structure, and particle properties.

However, by manufacturing the positive electrode active material of the above embodiment by a manufacturing method described below, a positive electrode active material having the above-described composition, crystal structure, particle structure, and particle properties can be easily manufactured.

Specifically, the positive electrode active material of the above embodiment is obtained by the following processes. That is, transition metal-containing composite hydroxide particles such as nickel manganese cobalt-containing composite hydroxide particles are prepared by switching between an oxidizing atmosphere and a non-oxidizing atmosphere during a crystallization process, the composite hydroxide particles and/or heat-treated particles obtained by heat-treating the composite hydroxide particles are mixed with a lithium compound, and the obtained lithium mixture is fired to obtain lithium transition metal-containing composite oxide particles. Thereafter, the composite oxide particles and the metal composite oxide of Li and M2 serving as a raw material of the coating layer are mixed and heat-treated to obtain a positive electrode active material including composite oxide particles coated with the metal composite oxide of Li and M2.

Hereinafter, each process will be described in detail by exemplifying a case where the composite oxide particles are lithium nickel manganese cobalt-containing composite oxide particles.

(1) Crystallization Process

Water, a sodium hydroxide aqueous solution, and ammonia water are supplied into a reaction tank in appropriate amounts, and a pre-reaction aqueous solution is prepared such that a pH value based on the liquid temperature of 25° C. is 11 or more and 13 or less, and an ammonium ion concentration is 9 g/L or more and 15 g/L is prepared. It is desirable to prepare a raw material aqueous solution of 1.0 mol/L or more and 3.0 mol/L or less by dissolving nickel sulfate, manganese sulfate, and cobalt sulfate in water such that a molar ratio of each of the metal elements (Ni, Co, and Mn) satisfies the above formula (A).

Next, by supplying the raw material aqueous solution to the pre-reaction aqueous solution while blowing a gas in a non-oxidizing atmosphere having an oxygen concentration of 2% by volume or less, such as argon gas or nitrogen, nuclear generation is performed. At this time, it is desirable to appropriately supply a sodium hydroxide aqueous solution and ammonia water to maintain a pH value and an ammonium ion concentration of an aqueous solution for nuclear generation within the above ranges.

After completion of nuclear generation, an acid such as sulfuric acid is added to adjust the pH value so as to be 10 or more and 12 or less based on the liquid temperature of 25° C. and smaller than the pH value in the nuclear generation process, thereby forming an aqueous solution for particle growth. After verifying that the pH value has reached a predetermined value, the raw material aqueous solution is supplied to grow the nuclei (particles) generated in the nuclear generation process. Note that, when an aqueous solution containing a compound of the additive element M1 is separately prepared, the aqueous solution containing the compound of the additive element M1 can be added only in the particle growth process or only in a specific stage of the particle growth process.

As the first stage of particle growth, crystallization in a non-oxidizing atmosphere having an oxygen concentration of 2% by volume or less is continued for a certain period of time from start of the particle growth process while stirring is performed using a stirrer.

As the second stage, switching operation 1 is performed in which air or oxygen is circulated in the reaction tank using an air diffuser tube having a pore size of 100 μm or more and 1 cm or less while supply of the raw material aqueous solution is continued, and the reaction atmosphere is adjusted to an oxidizing atmosphere having an oxygen concentration of 21% by volume or more. After the switching operation 1 is started, crystallization is performed while the oxidizing atmosphere is maintained and stirring is performed using a stirrer for a certain period of time.

As the third stage, switching operation 2 is performed in which gas in a non-oxidizing atmosphere is circulated in the reaction tank using the air diffuser tube while supply of the raw material aqueous solution is continued, and the reaction atmosphere is adjusted to a non-oxidizing atmosphere having an oxygen concentration of 2% by volume or less. After the switching operation 2 is started, crystallization is performed while the non-oxidizing atmosphere is maintained and stirring is performed using a stirrer for a certain period of time.

As the fourth stage, switching operation 3 is performed in which gas in an oxidizing atmosphere is circulated in the reaction tank using the air diffuser tube while supply of the raw material aqueous solution is continued, and the reaction atmosphere is adjusted to an oxidizing atmosphere having an oxygen concentration of 21% by volume or more. After the switching operation 3 is started, crystallization is performed while the oxidizing atmosphere is maintained and stirring is performed using a stirrer for a certain period of time.

As the fifth stage, switching operation 4 is performed in which gas in a non-oxidizing atmosphere is circulated in the reaction tank using the air diffuser tube while supply of the raw material aqueous solution is continued, and the reaction atmosphere is adjusted to a non-oxidizing atmosphere having an oxygen concentration of 2% by volume or less. After the switching operation 4 is started, crystallization is performed while the non-oxidizing atmosphere is maintained and stirring is performed using a stirrer for a certain period of time.

Time of each stage in the particle growth process satisfies second stage≤fourth stage<first stage≤third stage≤fifth stage. Crystallization time of the entire particle growth process is desirably eight hours or shorter.

The particle growth process can include the sixth stage in an oxidizing atmosphere and the seventh stage in a non-oxidizing atmosphere by similarly performing switching operations 5 and 6, respectively. Furthermore, the particle growth process can include the eighth stage in an oxidizing atmosphere and the ninth stage in a non-oxidizing atmosphere by performing switching operations 7 and 8, respectively. Furthermore, in addition, the particle growth process can include the tenth stage in an oxidizing atmosphere and the eleventh stage in a non-oxidizing atmosphere by performing switching operations 9 and 10, respectively.

Also in these cases, time of each stage in the particle growth process satisfies second stage≤fourth stage≤sixth stage≤eighth stage≤tenth stage<first stage≤third stage≤fifth stage≤seventh stage≤ninth stage≤eleventh stage.

After completion of the crystallization, the obtained product is washed with water, filtered, and dried to obtain predetermined nickel manganese cobalt-containing composite hydroxide particles.

In the particle growth process, it is desirable to appropriately supply a sodium hydroxide aqueous solution and ammonia water through the process to maintain a pH value and an ammonium ion concentration of the aqueous solution for particle growth within the above ranges.

The composite hydroxide particles obtained by such a crystallization process have a particle structure in which a low density layer and a high density layer are laminated on each other around a high-density center section. By using the composite hydroxide particles having such a particle structure as a precursor, composite oxide particles having a particle structure having an aggregated section, one or more communication holes communicating with an outer periphery section of the aggregated section, and one or more space sections present inside the aggregated section and communicating with the one or more communication holes can be easily obtained.

(2) Mixing Process

A mixing process is a process of mixing a lithium compound with the composite hydroxide particles described above and/or heat-treated particles obtained by heat-treating the composite hydroxide particles to obtain a lithium mixture.

In the mixing process, the composite hydroxide particles and/or the heat-treated particles are mixed with a lithium compound such that a ratio (Li/Me) of the number of atoms of Li (Li) to the sum of the number of atoms (Me) of metal atoms other than Li in the lithium mixture, specifically, Ni, Mn, Co, and the additive element M1 is 0.95 or more and 1.5 or less, preferably 1.0 or more and 1.5 or less, more preferably 1.0 or more and 1.35 or less, and still more preferably 1.0 or more and 1.2 or less. That is, since Li/Me does not change after the firing process as compared with Li/Me before the firing process, it is necessary to mix the composite hydroxide particles and/or the heat-treated particles with the lithium compound such that Li/Me in the mixing process is Li/Me of a target positive electrode active material.

The lithium compound used in the mixing process is not particularly limited, but lithium hydroxide, lithium nitrate, lithium carbonate, or a mixture of these is preferably used from a viewpoint of easy availability. Particularly, lithium hydroxide or lithium carbonate is preferably used in consideration of ease of handling and stability of quality.

A general mixer can be used for mixing. For example, a shaker mixer, a Lodige mixer, a Julia mixer, or a V blender can be used.

(3) Calcination Process

When lithium hydroxide or lithium carbonate is used as the lithium compound, it is also possible to perform a calcination process of calcining the lithium mixture at a temperature lower than a firing temperature described below, and at 350° C. or higher and 800° C. or lower, and preferably 450° C. or higher and 750° C. or lower after the mixing process and before the firing process. As a result, it is possible to sufficiently diffuse Li into the composite hydroxide particles, and more uniform composite oxide particles can be obtained.

Note that holding time at the above temperature is preferably one hour or longer and ten hours or shorter, and more preferably three hours or longer and six hours or shorter. Furthermore, the atmosphere in the calcination process is preferably an oxidizing atmosphere, and more preferably an atmosphere having an oxygen concentration of 18% by volume or more and 100% by volume or less as in the firing process described later.

(4) Firing Process

A firing process is a process of firing the lithium mixture obtained in the mixing process under a predetermined condition, and diffusing Li in the composite hydroxide particles and/or the heat-treated particles to cause a reaction, thereby obtaining composite oxide particles.

A furnace used in the firing process is not particularly limited as long as the furnace can heat the lithium mixture in the air or an oxygen flow. However, an electric furnace that does not generate gas is preferable from a viewpoint of keeping the atmosphere in the furnace uniform, and either a batch type electric furnace or a continuous type electric furnace can be preferably used. This is also the same for the furnace used in the heat treatment process and the calcination process.

a) Firing Temperature

A firing temperature of the lithium mixture is set to 720° C. or higher and 940° C. or lower. When the firing temperature is lower than 720° C., the composite hydroxide particles and/or the heat-treated particles do not sufficiently react with Li, and excessive Li or unreacted composite hydroxide particles and/or heat-treated particles may remain, or the crystallinity of a positive electrode active material to be obtained may be insufficient. On the other hand, when the firing temperature exceeds 940° C., there is a possibility that the communication holes and space sections in the composite oxide particles are crushed to reduce the BET specific surface area of a positive electrode active material to be finally obtained, to reduce the oil absorption amount thereof, and to increase in the tap density thereof. Furthermore, sintering between particles of the positive electrode active material severely occurs, abnormal grain growth is caused, and the ratio of coarse particles having ab irregular shape increases.

By controlling the firing temperature, it is possible to control the BET specific surface area, the oil absorption amount, the tap density, and the 50% cumulative diameter d50 determined from the particle size distribution measured value. The firing temperature of the lithium mixture is set to preferably 730° C. or higher and 920° C. or lower and more preferably 750° C. or higher and 900° C. or lower from a viewpoint of controlling the BET specific surface area of the positive electrode active material, the oil absorption amount thereof, the tap density thereof, and the 50% cumulative diameter d50 thereof determined from the particle size distribution measured value.

A temperature rising rate in the firing process is set to preferably 1° C./min or more and 10° C./min or less and more preferably 3° C./min or more and 8° C./min or less. Furthermore, during the firing process, at a temperature near the melting point of the lithium compound, it is more preferable to lower the temperature rising rate to set the temperature rising rate to 0.3° C./min or more and 6° C./min or less. As a result, a reaction between the composite hydroxide particles and/or the heat-treated particles and Li can be caused more uniformly.

b) Firing Time

Of the firing time, time during which the temperature is maintained at the above-described firing temperature is set to preferably at least two hours and more preferably three hours or longer and 20 hours or shorter. When the time during which the temperature is maintained at the firing temperature is shorter than two hours, Li is not sufficiently diffused into the composite hydroxide particles and/or the heat-treated particles, and excessive Li or unreacted composite hydroxide particles and/or heat-treated particles may remain, or the crystallinity of a positive electrode active material to be obtained may be insufficient.

c) Firing Atmosphere

An atmosphere when firing is preferably an oxidizing atmosphere, more preferably an atmosphere having an oxygen concentration of 18% by volume or more and 100% by volume or less, and still more preferably an atmosphere having an oxygen concentration of 50% by volume or more and 100% by volume or less. The atmosphere when firing is particularly preferably a mixed atmosphere of oxygen having the above oxygen concentration and an inert gas. That is, firing is preferably performed in the air or an oxygen flow. When the oxygen concentration is less than 18% by volume, the crystallinity of the positive electrode active material may be insufficient.

(5) Crushing Process

The composite oxide particles obtained by the firing process may be aggregated or slightly sintered particularly when the composite oxide particles are secondary particles. In such a case, the aggregate or sintered body is preferably crushed. This makes it possible to adjust the average particle size and the particle size distribution of a positive electrode active material to be obtained within a preferable range. Note that crushing means an operation of applying mechanical energy to an aggregate formed of a plurality of particles generated by, for example, sintering necking between the particles when firing to separate the particles from each other while hardly destroying the particles themselves, thus loosening the aggregate.

A known means can be used for crushing, and for example, a pin mill or a hammer mill can be used. Note that at this time, a crushing force is preferably controlled within an appropriate range so as not to destroy the particles themselves (secondary particles themselves).

As described above, by adjusting the firing conditions, the BET specific surface area of the composite oxide particles, the oil absorption amount thereof, the tap density thereof, and the 50% cumulative diameter d50 thereof determined from the particle size distribution measured value can be controlled, and finally, the positive electrode active material according to an embodiment of the present invention having predetermined particle properties can be easily obtained.

(6) Coating Process

In a coating process, an aqueous solution or an acidic aqueous solution containing ammonium or the like is sprayed while the composite oxide particles and oxides of one or more metals selected from Al, Ti, Zr, Nb, Mo, and W, which is the metal element M2 serving as a raw material of the coating layer, are mixed and stirred, and a heat treatment is performed. By such a treatment, a coating layer formed of fine particles and/or a coating film of a metal composite oxide of Li and M2 is formed on at least a part of a surface of the composite oxide particles.

A general stirrer can be used for mixing and stirring. For example, a shaker mixer, a drum mixer, a vacuum mixing dryer, or the like can be used. Stirring is performed under a condition that the composite oxide particles and the oxide of M2 can be sufficiently mixed to such an extent that the shapes of the composite oxide particles are not broken. However, a reaction between the oxide of M2 serving as a raw material of the coating layer and the lithium compound present on a surface of the composite oxide particles hardly proceeds simply by stirring the composite oxide particles and the oxide of M2. Therefore, stirring is preferably performed while water, an alkaline aqueous solution, or an acidic aqueous solution is appropriately sprayed.

When stirring is performed at room temperature, the oxide of M2 and the lithium compound do not sufficiently react with each other. Therefore, a heat treatment is preferably performed at a temperature of 100° C. or higher and 250° C. or lower for one hour or longer simultaneously with or after stirring.

Note that the coating layer is constituted by fine particles and/or a coating film of a metal composite oxide of Li and M2, as described above. It is determined by the moisture content of powder after dehydration whether fine particles or a coating film is formed or both of the fine particles and the coating film are formed. Therefore, by adjusting the moisture content of powder after dehydration according to the composition of the metal composite oxide of Li and M2, a desired structure of the coating layer can be obtained.

The amount of the metal element M2 contained in the coating layer is preferably 0.1 atom % or more and 1.5 atom % or less with respect to the total number of atoms of Ni, Co, and Mn contained in composite oxide powder to be mixed. This makes it possible to achieve both high output characteristic and durability. When the amount of M2 contained in the coating layer is less than 0.1 atom %, an effect of improving output characteristics cannot be sufficiently obtained in some cases. When the amount of M2 contained in the coating layer exceeds 1.5 atom %, the amount of the metal composite oxide of Li and M2 is excessively large, Li conduction between the positive electrode active material and an electrolyte is inhibited, and battery performance may be deteriorated. The amount of M2 contained in the coating layer is preferably 0.15 atom % or more and 1.4 atom % or less with respect to the total number of atoms of Ni, Co, and Mn contained in the composite oxide particles.

3. Lithium Ion Secondary Battery

A lithium ion secondary battery of an embodiment of the present invention can adopt a similar configuration to that of a general non-aqueous electrolyte secondary battery including constituent members such as a positive electrode, a negative electrode, a separator, and a non-aqueous electrolyte. Alternatively, the lithium ion secondary battery according to an embodiment of the present invention can adopt a similar configuration to that of a general solid electrolyte secondary battery including constituent members such as a positive electrode, a negative electrode, and a solid electrolyte. That is, the present invention can be widely applied to a secondary battery including a non-aqueous electrolyte solution secondary battery and an all-solid-state lithium ion secondary battery as long as the secondary battery is charged and discharged by de-inserting and inserting lithium ions. Note that embodiments described below are merely examples, and the present invention can be applied to lithium ion secondary batteries that are modified or improved in various ways based on the embodiments described in the present specification.

(1) Constituent Members a) Positive Electrode

Using the positive electrode active material according to an embodiment of the present invention, for example, a positive electrode of a lithium ion secondary battery is prepared as follows.

First, a conductive material and a binding agent are mixed with the positive electrode active material of the present embodiment. Furthermore, activated carbon and a solvent, for example, for adjusting viscosity are added thereto as necessary. These are kneaded to prepare a positive electrode mixture paste. At this time, a mixing ratio among the components in the positive electrode mixture paste is also an important factor for determining performance of the lithium ion secondary battery. For example, when the solid content of the positive electrode mixture excluding the solvent is 100 parts by mass, the content of the positive electrode active material can be 60 parts by mass or more and 95 parts by mass or less, the content of the conductive material can be 1 part by mass or more and 20 parts by mass or less, and the content of the binding agent can be 1 part by mass or more and 20 parts by mass or less as in a positive electrode of a general lithium ion secondary battery.

The obtained positive electrode mixture paste is applied to a surface of a collector, for example, made of aluminum foil and dried to scatter the solvent. Pressurization may be performed by a roll press or the like in order to increase the electrode density as necessary. In this way, a sheet-shaped positive electrode can be prepared. The sheet-shaped positive electrode is cut into an appropriate size according to a target battery, for example, and used for preparing a secondary battery. Note that, the method for preparing a positive electrode is not limited to the exemplified one, and other methods may be used.

Examples of the conductive material include graphite (natural graphite, artificial graphite, expanded graphite, and the like) and a carbon black-based material such as acetylene black or Ketjen black.

The binding agent serves to hold the active material particles together, and examples thereof include polyvinylidene fluoride (PVDF), polytetrafluoroethylene (PTFE), a fluorocarbon rubber, an ethylene propylene diene rubber, styrene butadiene, a cellulose-based resin, and polyacrylic acid.

In addition, a solvent that disperses the positive electrode active material, the conductive material, and the activated carbon and dissolves the binding agent can be added to the positive electrode mixture as necessary. Specifically, as the solvent, an organic solvent such as N-methyl-2-pyrrolidone can be used. Activated carbon can be added to the positive electrode mixture in order to increase electric double layer capacity.

b) Negative Electrode

Metallic lithium, a lithium alloy, or the like can be used for the negative electrode. Furthermore, a product formed by mixing a binding agent with a negative electrode active material capable of inserting and de-inserting lithium ions, adding an appropriate solvent thereto to form a paste-like negative electrode mixture, applying the negative electrode mixture to a surface of a collector made of metal foil such as copper, drying the negative electrode mixture, and compressing the resulting product to increase the electrode density as necessary can be used.

Examples of the negative electrode active material include a lithium-containing substance such as metallic lithium or a lithium alloy; natural graphite, artificial graphite, a fired organic compound such as a phenolic resin, and a powdery carbon substance such as coke, which are capable of inserting and de-inserting lithium ions. In this case, as the negative electrode binding agent, similarly to the positive electrode, a fluorine-containing resin such as PVDF can be used, and as the solvent that disperses the negative electrode active material and the binding agent, an organic solvent such as N-methyl-2-pyrrolidone can be used.

c) Separator

The separator is sandwiched between the positive electrode and the negative electrode in the lithium ion secondary battery, and has a function of separating the positive electrode from the negative electrode and holding the electrolyte. As such a separator, for example, a polyethylene or polypropylene thin film having a large number of fine pores can be used. However, the separator is not particularly limited as long as having the above-described function. Furthermore, a solid electrolyte can also be used.

d) Electrolyte

As the non-aqueous electrolyte used in the non-aqueous electrolyte secondary battery, a non-aqueous electrolyte solution obtained by dissolving a lithium salt as a supporting salt in an organic solvent, or the like is used.

As the organic solvent used in the non-aqueous electrolyte solution, one selected from the group consisting of a cyclic carbonate such as ethylene carbonate, propylene carbonate, butylene carbonate, or trifluoropropylene carbonate, a chain carbonate such as diethyl carbonate, dimethyl carbonate, ethylmethyl carbonate, or dipropyl carbonate, an ether compound such as tetrahydrofuran, 2-methyltetrahydrofuran, or dimethoxy ethane, a sulfur compound such as ethylmethylsulfone or butanesulton, and a phosphorus compound such as triethyl phosphate or trioctyl phosphate can be used singly, or two or more selected therefrom can be used in mixture.

Examples of the supporting salt include $LiPF_6$, $LiBF_4$, $LiClO_4$, $LiAsF_6$, $LiN(CF_3SO_2)_2$, and a composite salt thereof.

Note that the non-aqueous electrolyte solution may contain a radical scavenger, a surfactant, a flame retardant, and the like.

A solid electrolyte used in a solid electrolyte secondary battery such as an all-solid-state lithium ion secondary battery has a property of withstanding a high voltage. As the solid electrolyte, there are an inorganic solid electrolyte and an organic solid electrolyte.

Examples of an oxide-based electrolyte include an oxide containing oxygen (O) and having lithium ion conductivity and electronic insulation properties, such as $Li_{1.3}Al_{0.3}Ti_{1.7}(PO_4)_3$, $Li_3PO_4$, $Li_3PO_4N_x$, $LiBO_2N_x$, $LiNbO_3$, $LiTaO_3$, $Li_2SiO_3$, $Li_4SiO_4$—$Li_3PO_4$, $Li_4SiO_4$—$Li_3VO_4$, $Li_2O$—$B_2O_3$—$P_2O_5$, $Li_2O$—$SiO_2$, $Li_2O$—$B_2O_3$—$ZnO$, $Li_{1+x}Al_xTi_{2-x}(PO_4)_3$ (0≤X≤1), $Li_{1+x}Al_xG_{2-x}(PO_4)_3$ (0≤X≤1), $LiTi_2(PO_4)_3$, $Li_{3xx}La_{2/3-x}TiO_3$ (0≤X≤2/3), $Li_5La_3Ta2O_{12}$, $Li_7La_3Zr_2O_{12}$, $Li_6BaLa_2Ta_2O_{12}$, or $Li_{3.6}Si_{0.6}P_{0.4}O_4$.

Examples of a sulfide solid electrolyte include a sulfide containing sulfur (S) and having lithium ion conductivity and electronic insulation properties, such as $Li_2S$—$SiS_2$, $Li_2S$—$P_2S_5$, $LiI$—$Li_2S$—$SiS_2$, $LiI$—$Li_2S$—$P_2S_5$, $LiI$—$Li_2S$—$B_2S_3$, $Li_3PO_4$—$Li_2S$—$Si_2S$, $Li_3PO_4Li_2S$—$SiS_2$—$SiS$, $LiI$—$Li_2S$—$P_2O_5$, or $LiI$—$Li_3PO_4$—$P_2S_5$.

Examples of the inorganic solid electrolyte other than the oxide-based electrolyte and the sulfide solid electrolyte include $Li_3N$, $LiI$, and $Li_3N$—$LiI$—$LiOH$.

As the organic solid electrolyte, a high-molecular-weight compound exhibiting ionic conductivity can be used. For example, polyethylene oxide, polypropylene oxide, copolymers thereof, or the like can be used. Furthermore, the organic solid electrolyte can contain a supporting salt (lithium salt).

Note that, when the solid electrolyte is used, in order to secure contact between the electrolyte and the positive electrode active material, a solid electrolyte can be mixed also in the positive electrode material.

(2) Configuration of Lithium Ion Secondary Battery

The configuration of the lithium ion secondary battery is not particularly limited. A configuration including a positive electrode, a negative electrode, a separator, a non-aqueous electrolyte, and the like in a non-aqueous electrolyte secondary battery or a configuration including a positive electrode, a negative electrode, a solid electrolyte, and the like in a solid electrolyte secondary battery may be adopted. Furthermore, the shape of the secondary battery is not particularly limited, and various shapes such as a cylindrical shape or a layered shape can be adopted.

In the case of a non-aqueous electrolyte secondary battery, for example, the positive electrode and the negative electrode are laminated via the separator to form an electrode body, the obtained electrode body is impregnated with a non-aqueous electrolyte, a positive electrode collector is connected to a positive electrode terminal leading to the outside using a current collecting lead or the like, a negative electrode collector is connected to a negative electrode terminal leading to the outside using a current collecting lead or the like, and the resulting product is sealed in a battery case to complete a lithium ion secondary battery.

(3) Characteristics of Lithium Ion Secondary Battery

As described above, the lithium ion secondary battery of the present embodiment uses the positive electrode active material according to an embodiment of the present invention as a positive electrode material, and is therefore excellent in output characteristics and durability.

(4) Application of Lithium Ion Secondary Battery

As described above, the lithium ion secondary battery of the present embodiment is excellent in output characteristics and durability, and can be preferably used for a power supply of an electric tool or an environmental automobile which is required to have these characteristics at a high level.

EXAMPLES

Hereinafter, an example of an embodiment of the present invention will be described in detail with reference to Examples and Comparative Examples. Through a nuclear generation process and a particle growth process, a pH value of a reaction aqueous solution was measured by a pH controller, and by adjusting the supply amount of a sodium hydroxide aqueous solution based on the measured value, a fluctuation range of the pH value of the reaction aqueous solution in each of the processes was controlled to be within a range of ±0.2.

Example 1 a) Manufacture of Composite Hydroxide

[Nuclear Generation Process]

First, 17 L of water was put in a reaction tank, and the temperature in the tank was set to 40° C. while water was stirred. At this time, a nitrogen gas was circulated in the reaction tank for one hour to set the reaction atmosphere to a non-oxidizing atmosphere having an oxygen concentration of 2% by volume or less. Subsequently, a 25% by mass sodium hydroxide aqueous solution and 25% by mass ammonia water were supplied into the reaction tank in appropriate amounts, and adjustment was performed such that a pH value was 12.6 on the basis of the liquid temperature of 25° C. and an ammonium ion concentration was 10 g/L, thereby forming a pre-reaction aqueous solution.

At the same time, nickel sulfate, manganese sulfate, and cobalt sulfate were dissolved in water such that a molar ratio among the metal elements satisfied Ni:Co:Mn=5:2:3 to prepare a 2 mol/L raw material aqueous solution.

Next, the raw material aqueous solution was supplied to the pre-reaction aqueous solution at 115 ml/min to form an aqueous solution for nuclear generation, and nuclear generation was performed for 1 minute. At this time, a 25% by mass sodium hydroxide aqueous solution and 25% by mass ammonia water were appropriately supplied to maintain the pH value and ammonium ion concentration of the aqueous solution for nuclear generation within the above ranges.

[Particle Growth Process]

After completion of nuclear generation, supply of all the aqueous solutions was stopped temporarily, and sulfuric acid was added to adjust the pH value to 11.0 on the basis of the liquid temperature of 25° C., thereby forming an aqueous solution for particle growth. It was confirmed that the pH value had reached a predetermined value. Thereafter, the raw material aqueous solution was supplied at a similar constant rate of 100 ml/min to that in the nuclear generation process to grow the nuclei (particles) generated in the nuclear generation process.

As the first stage, crystallization in a non-oxidizing atmosphere having an oxygen concentration of 2% by volume or less was continued for 35 minutes from start of the particle growth process while stirring was performed using a stirrer.

As the second stage, air was circulated in the reaction tank using a SUS air diffuser tube having a pore size of 1.0 mm while supply of the raw material aqueous solution was continued, and the reaction atmosphere was adjusted to an oxidizing atmosphere having an oxygen concentration of 21% by volume (switching operation 1). After start of the switching operation 1, crystallization was performed for 20 minutes while stirring was performed using a stirrer.

As the third stage, nitrogen was circulated in the reaction tank using the air diffuser tube while supply of the raw material aqueous solution was continued, and the reaction atmosphere was adjusted to a non-oxidizing atmosphere having an oxygen concentration of 2% by volume or less (switching operation 2). After start of the switching operation 2, crystallization was performed for 65 minutes while stirring was performed using a stirrer.

As the fourth stage, air was circulated in the reaction tank using the air diffuser tube while supply of the raw material aqueous solution was continued, and adjustment to an oxidizing atmosphere having an oxygen concentration of 21% by volume was performed (switching operation 3). After start of the switching operation 3, crystallization was performed for 40 minutes while stirring was performed using a stirrer.

As the fifth stage, nitrogen was circulated in the reaction tank using the air diffuser tube while supply of the raw material aqueous solution was continued, and the reaction atmosphere was adjusted to a non-oxidizing atmosphere having an oxygen concentration of 2% by volume or less (switching operation 4). After start of the switching operation 4, crystallization was performed for 110 minutes while stirring was performed using a stirrer.

Thereafter, supply of all the aqueous solutions including the raw material aqueous solution was stopped to complete the particle growth process. The obtained product was washed with water, filtered, and dried to obtain composite hydroxide particles.

Note that, in the particle growth process, a 25% by mass sodium hydroxide aqueous solution and 25% by mass ammonia water were appropriately supplied through the process to maintain the pH value and ammonium ion concentration of the aqueous solution for particle growth within the above ranges.

b) Preparation of Positive Electrode Active Material

The obtained composite hydroxide was sufficiently mixed with lithium hydroxide using a shaker mixer such that Li/Me was 1.10 to obtain a lithium mixture (mixing process).

The temperature of this lithium mixture was raised to 920° C. in an oxygen (oxygen concentration: 100% by volume) atmosphere at a temperature rising rate of 1.3° C./min. The lithium mixture was held at this temperature for three hours to be fired, and cooled to room temperature (firing process).

In order to eliminate aggregation or slight sintering of the obtained lithium transition metal-containing composite oxide particles, this positive electrode active material was crushed (crushing process).

Thereafter, while tungsten oxide in an amount of 0.8% by mass with respect to the mass of the lithium transition metal-containing composite oxide particles was sufficiently stirred with the composite oxide particles using a mixing stirrer, water (pure water) in an amount of 10% by mass with respect to the mass of the composite oxide particles was sprayed onto a surface of the composite oxide particles. Thereafter, a heat treatment was performed at 150° C. for one hour to perform a surface treatment (coating process).

c) Evaluation of Positive Electrode Active Material

[Composition]

The composition of the positive electrode active material and W in the coating layer were analyzed by analysis using an ICP emission spectrometer (ICPE-9000 manufactured by Shimadzu Corporation). The content of W was 0.4 atom %.

[Particle Size Distribution]

Using a laser light diffraction scattering particle size analyzer (Microtrac MT 3300 EXII manufactured by Microtrac Bell Co., Ltd.), the 50% cumulative diameter d50, the 10% cumulative diameter d10, and the 90% cumulative diameter d90 of the positive electrode active material determined from the particle size distribution measured value were measured.

[BET Specific Surface Area and Tap Density]

The BET specific surface area was measured by a flow method gas adsorption type specific surface area measuring apparatus (Macsorb 1200 series manufactured by Mountech Co., Ltd.), and the tap density was measured by a tapping machine (KRS-406 manufactured by Kuramochi Scientific Instruments Co., Ltd.).

[Oil Absorption Amount]

The oil (di-n-butyl phthalate (DBP)) absorption amount was measured using an absorption amount measuring apparatus (S-500 manufactured by Asahi Soken Co., Ltd) in accordance with "JIS K 6217-4: 2008".

[Particle Structure]

A part of the positive electrode active material was embedded in a resin, cross section polisher (IB-19530CP manufactured by JEOL Ltd.) processing was performed such that a cross section thereof could be observed, and then the cross section was observed by an SEM (FE-SEM: JSM-6360LA manufactured by JEOL Ltd.). As shown in FIG. 1, it was confirmed that the positive electrode active material of Example 1 included secondary particles each formed of an aggregation of a plurality of primary particles, had about six communication holes in an outer periphery section of the secondary particle, and had about ten space sections in the secondary particle, and that the communication holes in the outer periphery section and the internal space sections were connected to each other.

[Identification of Coating Layer]

Using BL19B2 of SPring 8, synchrotron radiation powder X-ray diffraction measurement and electron diffraction using a transmission electron microscope were performed to identify the coating layer.

d) Preparation of Secondary Battery

Figure 4:
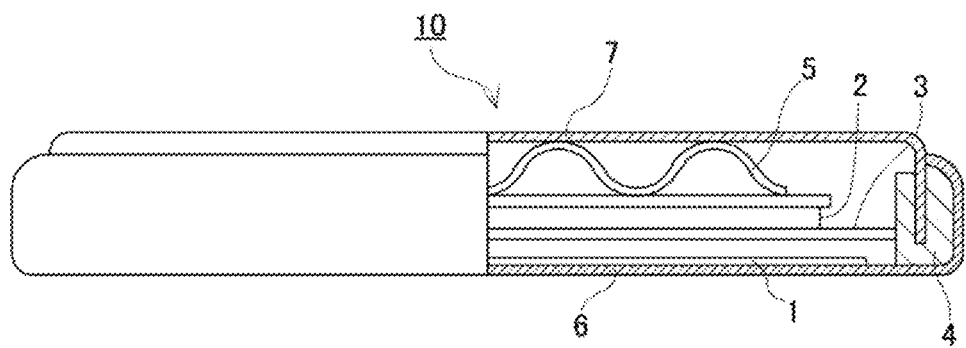
FIG. 4 is a schematic cross-sectional view of a 2032 type coin-type battery used for battery evaluation.

A 2032 type coin-type battery 10 as illustrated in FIG. 4 was prepared. Specifically, 52.5 mg of the positive electrode active material obtained as described above, 15 mg of acetylene black, and 7.5 mg of PTFE were mixed and press-molded to a diameter of 11 mm and a thickness of 100 μm at a pressure of 100 MPa, thereby preparing a positive electrode 1.

Next, a 2032 type coin-type battery using this positive electrode 1 was prepared in a glove box having an Ar atmosphere with a dew point controlled at −60° C. For a negative electrode 2 of the 2032 type coin-type battery, a lithium metal having a diameter of 14 mm and a thickness of 1 mm was used. For a non-aqueous electrolyte solution, an equivalent mixed solution of ethylene carbonate (EC) and diethyl carbonate (DEC) using 1 M $LiClO_4$ as a supporting electrolyte (manufactured by Ube Industries, Ltd.) was used. As a separator 3, a polyethylene porous film having a film thickness of 25 μm was used. In this way, the 2032 type coin-type battery 10 having a gasket 4 and a wave washer 5 and including a positive electrode can 6 and a negative electrode can 7 was assembled.

e) Battery Evaluation

[Positive Electrode Resistance]

Figure 5:
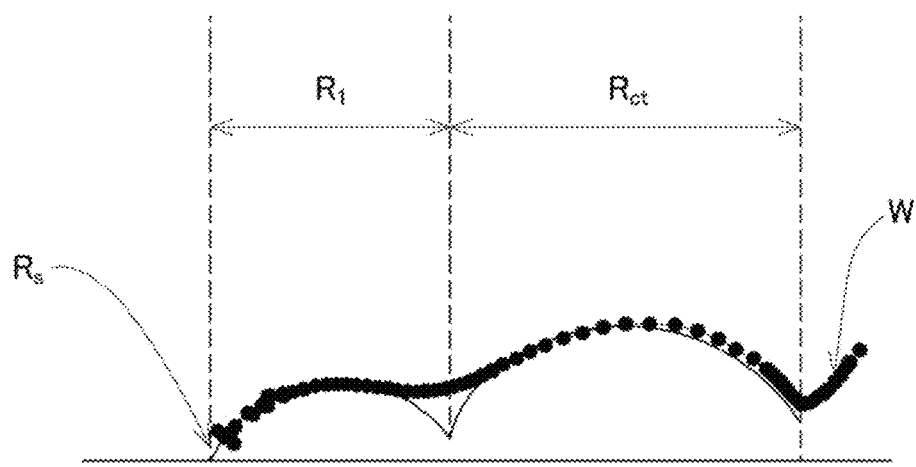
FIG. 5 illustrates a measurement example of impedance evaluation.
Figure 6:
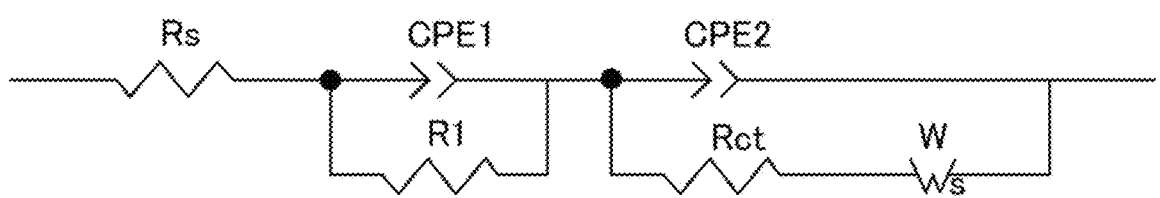
FIG. 6 is a schematic explanatory diagram of an equivalent circuit used for analysis.

For measurement of positive electrode resistance, an impedance measuring method is used, that is, a 2032 type coin-type battery was charged at 3.8 V, and the positive electrode resistance was measured using a frequency response analyzer and a potentiogalvanostat (1255B manufactured by Solartron Analytical Inc.) by an AC impedance method to obtain an impedance spectrum illustrated in FIG. 5. In the obtained impedance spectrum, two semicircles were observed in a high frequency area and an intermediate frequency area, and a straight line was observed in a low frequency area. Therefore, an equivalent circuit illustrated in FIG. 6 was assembled, and positive electrode interface resistance was analyzed. Here, $R_s$ represents bulk resistance, $R_l$ represents positive electrode coating film resistance, $R_{ct}$ represents electrolyte solution/positive electrode interface resistance, W represents a Warburg component, and CPE1 and CPE2 represent constant phase elements. Note that the positive electrode interface resistance indicates a resistance decrease ratio with respect to positive electrode interface resistance of a positive electrode active material of Comparative Example 1 described below.

The overall composition and characteristics of the obtained positive electrode active material and the characteristics of the obtained lithium ion secondary battery are presented in Table 1. Note that these items of Examples 2 and 3 and Comparative Example 1 are also presented in Table 1 similarly.

Example 2

Figure 2:
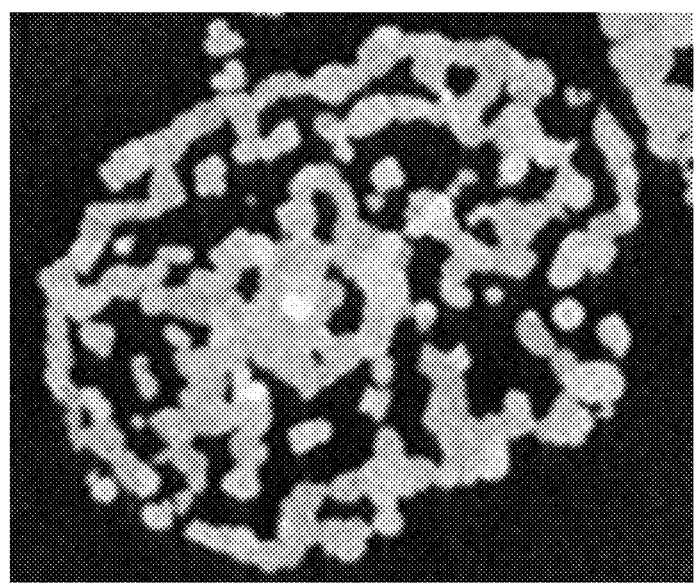
FIG. 2 is an SEM image of a cross section of secondary particles constituting a positive electrode active material for a lithium ion secondary battery of Example 2.

A positive electrode active material was obtained and evaluated in a similar manner to Example 1 except that the lithium mixture was heated to 890° C. and held at this temperature for three hours for firing. FIG. 2 shows a particle structure of the obtained positive electrode active material. It was confirmed that the positive electrode active material of Example 2 included secondary particles each formed of an aggregation of a plurality of primary particles, had about eight communication holes in an outer periphery section of the secondary particle, and had about 14 space sections inside the secondary particle, and that the communication holes in the outer periphery section and the internal space sections were connected to each other.

Example 3

A positive electrode active material was obtained and evaluated in a similar manner to Example 2 except that the mass of the tungsten oxide treated in the coating process was 0.4% by mass. The content of W was 0.2 atom %.

Comparative Example 1

Figure 3:
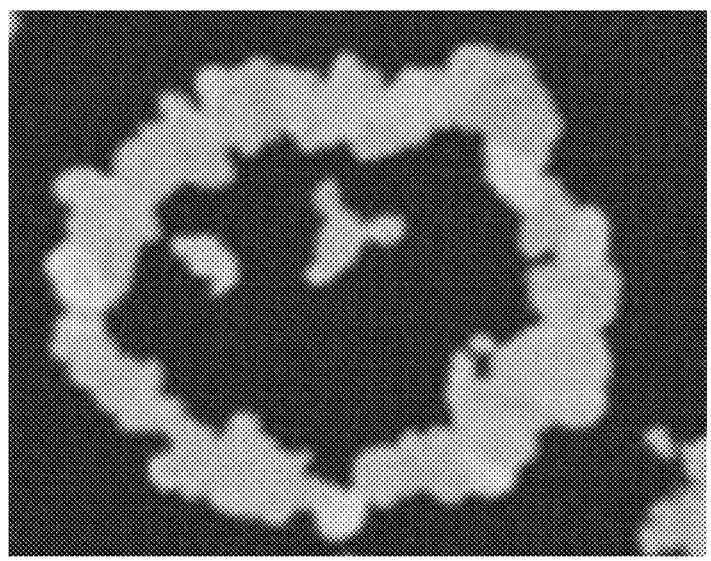
FIG. 3 is an SEM image of a cross section of secondary particles constituting a positive electrode active material for a lithium ion secondary battery of Comparative Example 1.

A positive electrode active material was obtained and evaluated in a similar manner to Example 1 except that in the crystallization process, crystallization was performed by adjusting the atmosphere to an oxidizing atmosphere having an oxygen concentration of 21% by volume from the nuclear generation process up to the switching operation 1 in the particle growth process, and by adjusting the atmosphere to a non-oxidizing atmosphere having an oxygen concentration of 2% by volume or less in the subsequent process, and thus a composite hydroxide was obtained. FIG. 3 shows a particle structure of the obtained positive electrode active material. It was confirmed that the positive electrode active material of Comparative Example 1 has a hollow structure in which secondary particles are formed of an aggregation of a plurality of primary particles, the secondary particle each having one communication hole in an outer periphery section of the secondary particle, and having one space section in the secondary particle, the communication hole in the outer periphery section and the internal void being connected to each other.

TABLE 1

| | Composition | d50 (μm) | BET specific surface area ($m^2$/g) | Tap density (g/$cm^3$) | Oil absorption amount (ml/100 g) | Content of W (at %) | (d90 − d10)/d50 |
|---|---|---|---|---|---|---|---|
| Example 1 | $Li_{1.1}Ni_{0.5}Mn_{0.3}Co_{0.2}O_2$ | 4.9 | 2.9 | 1.5 | 42 | 0.4 | 0.45 |
| Example 2 | $Li_{1.1}Ni_{0.5}Mn_{0.3}Co_{0.2}O_2$ | 5.0 | 3.2 | 1.4 | 48 | 0.4 | 0.44 |
| Example 3 | $Li_{1.1}Ni_{0.5}Mn_{0.3}Co_{0.2}O_2$ | 5.0 | 3.2 | 1.4 | 49 | 0.2 | 0.44 |
| Comparative Example 1 | $Li_{1.1}Ni_{0.5}Mn_{0.3}Co_{0.2}O_2$ | 5.1 | 1.2 | 1.5 | 40 | 0.4 | 0.45 |

TABLE 1-continued

|  | | Particle structure | | Positive electrode |
| --- | --- | --- | --- | --- |
|  | d90/d10 | Number of communication holes | Number of space sections | Form of coating layer | interface resistance (based on Comparative Example 1) |
| Example 1 | 1.5 | 6 | 10 | $Li_2O_7W_2$ | 0.8 |
| Example 2 | 1.4 | 8 | 14 | $Li_2O_7W_2$ | 0.7 |
| Example 3 | 1.4 | 8 | 14 | $Li_2O_7W_2$ | 0.6 |
| Comparative Example 1 | 1.5 | 1 | 1 | $Li_2O_7W_2$ | 1 |

In each of the positive electrode active materials of Examples 1 to 3 within the scope of the present invention, it was confirmed that positive electrode resistance was reduced and output characteristics were improved when each of the positive electrode active materials was used in a lithium ion secondary battery, as compared with those of Comparative Example 1.

REFERENCE SIGNS LIST

1 Positive electrode (electrode for evaluation)
2 Negative electrode
3 Separator
4 Gasket
5 Wave washer
6 Positive electrode can
7 Negative electrode can
10 Coin-type battery

The invention claimed is:

1. A positive electrode active material for a lithium ion secondary battery, the positive electrode active material comprising:
    lithium transition metal-containing composite oxide particles having a composition represented by general formula (A): $Li_{1+u}Ni_xMn_yCo_zM1_tO_2$, where $-0.05 \leq u \leq 0.5$, $x+y+z+t=1$, $0.3 \leq x \leq 0.9$, $0 \leq y \leq 0.5$, $0 \leq z \leq 0.5$, $0 < t \leq 0.1$, and M1 is one or more additive elements selected from Mg, Al, Si, Ca, Ti, V, Cr, Zr, Nb, Mo, Hf, Ta, and W, and a layered rock salt type crystal structure; and
    a coating layer present on at least a part of a surface of the lithium transition metal-containing composite oxide particles and formed of fine particles and/or a coating film of a metal composite oxide of Li and a metal element M2, where M2 represents one or more metal elements selected from Al, Ti, Zr, Nb, Mo, and W, wherein
    the lithium transition metal-containing composite oxide particles including the coating layer has a 50% cumulative diameter d50 of 3.0 μm or more and 7.0 μm or less, the 50% cumulative diameter d50 being determined from a particle size distribution measured value, a BET specific surface area of 2.0 m²/g or more and 5.0 m²/g or less, a tap density of 1.0 g/cm³ or more and 2.0 g/cm³ or less, and an oil absorption amount of 30 ml/100 g or more and 60 ml/100 g or less,
    the amount of M2 contained in the coating layer is 0.1 atom % or more and 1.5 atom % or less with respect to the total number of atoms of Ni, Mn, and Co contained in the lithium transition metal-containing composite oxide particles, and
    [(d90−d10)/d50], where d10 is a 10% cumulative diameter determined from a particle size distribution measured value, and d90 is a 90% cumulative diameter determined from the particle size distribution measured value, the [(d90−d10)/d50] being an index indicating spread of a particle size distribution of the lithium transition metal-containing composite oxide particles including the coating layer, is 0.3 or more and 1.0 or less.

2. The positive electrode active material for a lithium ion secondary battery according to claim 1, wherein the 50% cumulative diameter d50 of the lithium transition metal-containing composite oxide particles including the coating layer is 4.0 μm or more and 6.0 μm or less, the 50% cumulative diameter d50 being determined from the particle size distribution measured value.

3. The positive electrode active material for a lithium ion secondary battery according to claim 1, wherein a value of d90/d10 of the lithium transition metal-containing composite oxide particles including the coating layer, where d10 is a 10% cumulative diameter determined from a particle size distribution measured value, and d90 is a 90% cumulative diameter determined from the particle size distribution measured value, is 1.0 or more and 2.0 or less.

4. The positive electrode active material for a lithium ion secondary battery according to claim 1, wherein the lithium transition metal-containing composite oxide particles are composed of secondary particles each formed of an aggregation of primary particles, and the secondary particle has an aggregated section, one or more communication holes communicating with an outer periphery section of the aggregated section, and two or more space sections present inside the aggregated section and communicating with the one or more communication holes.

5. The positive electrode active material for a lithium ion secondary battery according to claim 1, wherein M2 contained in the coating layer is W.

6. The positive electrode active material for a lithium ion secondary battery according to claim 5, wherein the metal composite oxide is lithium tungstate.

7. A lithium ion secondary battery comprising: a positive electrode; a negative electrode; a separator; and a non-aqueous electrolyte, or a positive electrode; a negative electrode; and a solid electrolyte, wherein
    the positive electrode active material for a lithium ion secondary battery according to claim 1 is used as a positive electrode active material used in the positive electrode.

8. A positive electrode active material for a lithium ion secondary battery, the positive electrode active material comprising:
    lithium transition metal-containing composite oxide particles having a composition represented by general formula (A): $Li_{1+u}Ni_xMn_yCo_zM1_tO_2$, where $-0.05 \leq u \leq 0.5$, $x+y+z+t=1$, $0.3 \leq x \leq 0.9$, $0 \leq y \leq 0.5$, $0 \leq z \leq 0.5$, $0 \leq t \leq 0.1$, and MI is one or more additive elements selected from Mg, Al, Si, Ca, Ti, V, Cr, Zr, Nb, Mo, Hf, Ta, and W, and a layered rock salt type crystal structure; and a coating layer present on at least a part of a surface of the lithium transition metal-containing composite oxide particles and formed of fine particles and/or a coating film of a metal composite oxide of Li and a metal element M2, where M2 represents one or more metal elements selected from Al, Ti, Zr, Nb, Mo, and W, wherein the lithium transition metal-containing composite oxide particles including the coating layer has a 50% cumulative diameter d50 of 3.0 µm or more and 7.0 µm or less, the 50% cumulative diameter d50 being determined from a particle size distribution measured value, a BET specific surface area of 2.0 $m^2/g$ or more and 5.0 $m^2/g$ or less, a tap density of 1.0 $g/cm^3$ or more and 2.0 $g/cm^3$ or less, and an oil absorption amount of 30 ml/100 g or more and 60 ml/100 g or less, the amount of M2 contained in the coating layer is 0.1 atom % or more and 1.5 atom % or less with respect to the total number of atoms of Ni, Mn, and Co contained in the lithium transition metal-containing composite oxide particles, and the lithium transition metal-containing composite oxide particles are composed of secondary particles each formed of an aggregation of primary particles, and the secondary particle has an aggregated section, one or more communication holes communicating with an outer periphery section of the aggregated section, and two or more space sections present inside the aggregated section and communicating with the one or more communication holes.

* * * * *